(12) United States Patent
Kim (10) Patent No.: US 12,307,744 B2
(45) Date of Patent: May 20, 2025

(54) ELECTRONIC DEVICE FOR CONVERTING A LIGHT SOURCE SENSING IMAGE OF A SUBJECT INTO AN IMAGE LAYER TO GENERATE IMAGE DATA AND A METHOD OF OPERATING THE ELECTRONIC DEVICE

(71) Applicant: SK hynix Inc., Icheon-si Gyeonggi-do (KR)

(72) Inventor: Jin Su Kim, Icheon-si Gyeonggi-do (KR)

(73) Assignee: SK hynix Inc., Icheon-si (KR)

(*) Notice: Subject to any disclaimer, the term of this patent is extended or adjusted under 35 U.S.C. 154(b) by 626 days.

(21) Appl. No.: 17/577,124

(22) Filed: Jan. 17, 2022

(65) Prior Publication Data

US 2023/0053601 A1    Feb. 23, 2023

(30) Foreign Application Priority Data

Aug. 18, 2021    (KR) .................... 10-2021-0109019

(51) Int. Cl.
*G06V 10/82*    (2022.01)
*G06V 10/56*    (2022.01)
(Continued)

(52) U.S. Cl.
CPC .......... *G06V 10/7715* (2022.01); *G06V 10/56* (2022.01); *G06V 10/764* (2022.01); *G06V 10/82* (2022.01)

(58) Field of Classification Search
CPC ........ G06N 3/0464; G06N 3/08; G06N 20/00; G06N 20/10; G06T 3/4046;
(Continued)

(56) References Cited

U.S. PATENT DOCUMENTS

2012/0147205 A1*    6/2012    Lelescu .................. H04N 23/62
                                                        348/E5.024
2018/0315154 A1*    11/2018   Park .................... G06F 18/2413
(Continued)

FOREIGN PATENT DOCUMENTS

CN    109993806 A    *    7/2019
CN    111931857 A    *    11/2020    ........... G06K 9/6268
(Continued)

OTHER PUBLICATIONS

Chen et al., Dynamic Convolution: Attention over Convolution Kernels, CVPR 2020, Mar. 31, 2020, arXiv:1912.03458v2, doi.org/10.48550/arXiv.1912.03458, pp. 11030-11039.*
(Continued)

*Primary Examiner* — Guillermo M Rivera-Martinez
(74) *Attorney, Agent, or Firm* — WILLIAM PARK & ASSOCIATES LTD.

(57) ABSTRACT

An image sensing device, and a method of operating the same, includes an image sensor and an image processor. The image sensor is configured to sense light sourced from a subject and generate an image layer. The image processor is configured to generate a feature map by performing a convolution operation on the image layer and a fixed-size kernel, generate a final feature map by performing convolution operations on a variable-size kernel and the feature map, and generate image data including channels in which the final feature map is classified for each color.

19 Claims, 9 Drawing Sheets

(51) Int. Cl.
*G06V 10/764* (2022.01)
*G06V 10/77* (2022.01)

(58) Field of Classification Search
CPC ........... G06T 2207/20084; G06T 2207/20081; G06V 10/82; G06V 10/56
See application file for complete search history.

(56) References Cited

U.S. PATENT DOCUMENTS

| | | | | |
|---|---|---|---|---|
| 2020/0004514 | A1* | 1/2020 | Yu | G06N 3/08 |
| 2020/0159809 | A1* | 5/2020 | Catthoor | G06N 3/04 |
| 2020/0234411 | A1* | 7/2020 | Xu | H04N 9/646 |
| 2020/0279358 | A1* | 9/2020 | Li | G06T 7/0002 |

FOREIGN PATENT DOCUMENTS

| | | | | | |
|---|---|---|---|---|---|
| CN | 109996023 | B | * | 6/2021 | ............... H04N 7/01 |
| CN | 113239815 | A | * | 8/2021 | ............ G06F 18/214 |
| CN | 113256499 | A | * | 8/2021 | ............... G06N 3/08 |
| CN | 112818849 | B | * | 3/2024 | ............... G06N 3/04 |
| KR | 20200023221 | A | | 3/2020 | |
| KR | 102140805 | B1 | * | 8/2020 | |

OTHER PUBLICATIONS

Ciresan et al., Flexible, high performance convolutional neural networks for image classification, IJCAI'11: Proceedings of the Twenty-Second international joint conference on Artificial Intelligence—Volume vol. Two Jul. 2011, Jul. 16, 2011, pp. 1237-1242.*
Tang et al., Rethinking 1D-CNN for Time Series Classification: A Stronger Baseline, Feb. 12, 2021, Xiv:2002.10061v2, doi.org/10.48550/arXiv.2002.10061, pp. 1-7.*
Li et al., Selective Kernel Networks, CVPR, Mar. 18, 2019, arXiv:1903.06586v2, doi.org/10.48550/arXiv.1903.06586, pp. 510-519.*
Li et al., Selective Kernel Networks, CVPR 2019, pp. 510-519, arXiv:1903.06586v2, doi.org/10.48550/arXiv.1903.06586.*

* cited by examiner

ELECTRONIC DEVICE FOR CONVERTING A LIGHT SOURCE SENSING IMAGE OF A SUBJECT INTO AN IMAGE LAYER TO GENERATE IMAGE DATA AND A METHOD OF OPERATING THE ELECTRONIC DEVICE

CROSS-REFERENCE TO RELATED APPLICATION

The present application claims priority under 35 U.S.C. § 119(a) to Korean patent application number 10-2021-0109019, filed on Aug. 18, 2021, in the Korean Intellectual Property Office, the entire disclosure of which is incorporated herein by reference.

BACKGROUND

1. Technical Field

The present disclosure relates to an electronic device and a method of operating the same, and more particularly, to an electronic device capable of converting a light source of a subject into an image layer and converting the image layer into image data, and a method of operating the same.

2. Related Art

As content processing technology and content processing devices develop, images are used more frequently for content. An image is a means of transferring information about a subject to a user through sight, and has a transmittance higher than that of a normal text or a voice using only hearing. An image may be captured through an image sensor such as a charge coupled device (CCD) or a complementary metal-oxide semiconductor (CMOS), and an image layer generated by the image sensor may be converted into image data through an image processor.

SUMMARY

An embodiment of the present disclosure provides an electronic device capable of reducing complexity of an operation for generating image data and shortening an operation time by adjusting a size of a kernel and a receptive field according to a size of a subject, and a method of operating the same.

According to an embodiment of the present disclosure, an electronic device includes an image sensor and an image processor. The image sensor is configured to sense light sourced from a subject and generate an image layer. The image processor is configured to generate a feature map by performing a convolution operation on the image layer and a fixed-size kernel, generate a final feature map by performing convolution operations on a variable-size kernel and the feature map, and generate image data including channels in which the final feature map is classified for each color.

According to an embodiment of the present disclosure, a method of operating an electronic device includes converting an image of a subject into an image layer, generating the image layer as an initial feature map by performing a convolution operation using a fixed-size kernel, and comparing a size of the subject included in the initial feature map with a size of a receptive field. The method further includes generating a plurality of feature maps by adjusting the size of a variable-size kernel and the receptive field according to a comparison result, and generating channels in which a final feature map among the plurality of feature maps is classified for each color, and generating feature data including the channels.

According to the present technology, an image may be precisely detected according to a size of a subject, and complexity and an operation time of an operation for converting an image layer into image data may be improved.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Figure 1:
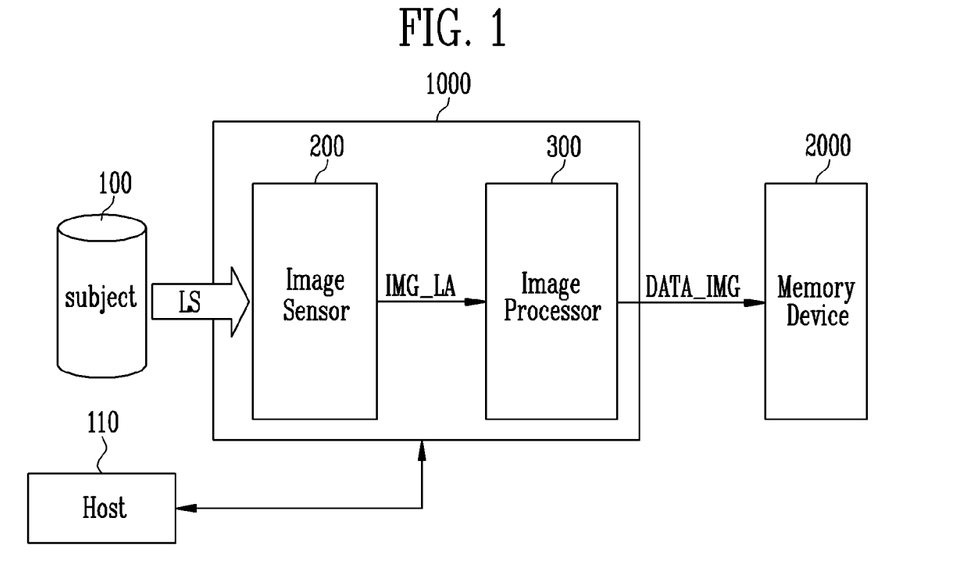
FIG. 1 is a diagram illustrating an electronic device according to an embodiment of the present disclosure.

FIG. 1 is a diagram illustrating an electronic device according to an embodiment of the present disclosure.

Referring to FIG. 1, an electronic device 1000 may be configured to obtain an image of a subject 100. The electronic device 1000 may be configured to store, display, or output image data DATA_IMG, which is obtained by processing the image, to an external device. The electronic device 1000 according to an embodiment may output the image data DATA_IMG to a host 110 according to a request received from the host 110.

In an embodiment, the electronic device 1000 may be implemented in a form of a packaged module, a part, or the like. In this case, the electronic device 1000 may be mounted on the host 110. The host 110 may be implemented as various electronic devices. For example, the host 110 may be implemented as a digital camera, a mobile device, a smart phone, a personal computer (PC), a tablet PC, a notebook, a personal digital assistant (PDA), an enterprise digital assistant (EDA), a portable multimedia player (PMP), a wearable device, a black box, a robot, an autonomous vehicle, and the like.

In another embodiment, the electronic device 1000 may be implemented as an electronic device separate from the host 110. For example, the electronic device 1000 may be an imaging device, a digital camera, a camcorder, a closed-circuit television (CCTV), a webcam, a security camera, an industrial vision camera, a mobile device, a smart phone, a PC, a tablet PC, a notebook, a personal digital assistant (PDA), an enterprise digital assistant (EDA), a portable multimedia player (PMP), a wearable device, a black box, a robot, an autonomous vehicle, an in-vehicle vision camera, a set-top box, a game console, an electronic dictionary, an e-book reader, a desktop computer, a server, an MP3 player, a smart medical device, a television, a digital video disk (DVD) player, an audio, a refrigerator, an air conditioner, a cleaner, an oven, a microwave oven, a washing machine, an air purifier, a smart mirror, a smart window, an electronic key, an electronic picture frame, a digital billboard, a security control panel, and the like. Here, the wearable device may be a smart watch, a ring, a bracelet, an anklet, a necklace, glasses, a contact lens, a head-mounted-device (HMD), a skin pad, an electronic tattoo, a biological transplant type circuit, or the like.

The electronic device 1000 may be configured to convert a light source LS reflected from the subject 100, that is, light sourced from the subject 100, into the image data DATA_IMG. Here, the subject 100 may include all living things or objects to be captured.

The electronic device 1000 may receive the light source LS for the subject 100, analyze the received light source LS, and output the light source as the image data DATA_IMG. For example, the electronic device 1000 may include an image sensor 200 and an image processor 300.

The image sensor 200 may be configured to convert the light source LS into an image layer IMG_LA which is digital data. The image processor 300 may be configured to output the image data DATA_IMG by compressing the image layer IMG_LA. For example, the image processor 300 may process the image layer IMG_LA by using a deep learning technique, and generate the image data DATA_IMG as a result of the operation.

The image data DATA_IMG output from the image processor 300 may be transmitted to a memory device 2000 capable of storing data. Although the memory device 2000 is shown as an embodiment for storing the image of the subject 100 in FIG. 1, the image data DATA_IMG may be transmitted to a storage device other than the memory device 2000 according to a purpose of the electronic device 1000.

The image processor 300 according to an embodiment may be configured to analyze a size of the subject 100 from the image layer IMG_LA and determine a size of a receptive field according to the size of the subject 100. In addition, the image processor 300 according to an embodiment may be configured to generate a feature map according to a receptive field of which a size is adjusted and output the image data DATA_IMG based on the feature map.

Figure 2:
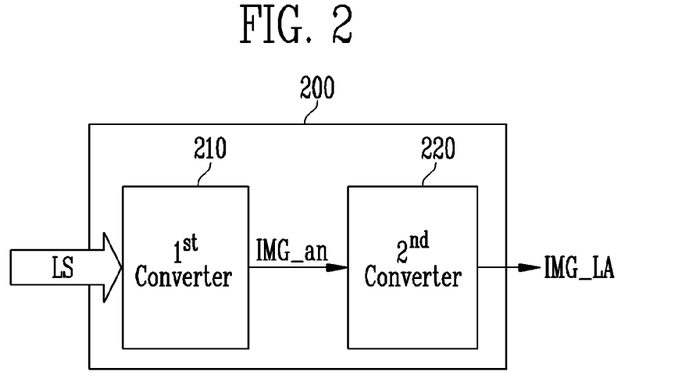
FIG. 2 is a diagram illustrating an image sensor according to an embodiment of the present disclosure.

FIG. 2 is a diagram illustrating an image sensor according to an embodiment of the present disclosure.

Referring to FIG. 2, the image sensor 200 may be implemented as a charge coupled device (CCD) image sensor or a complementary metal-oxide semiconductor (CMOS) image sensor.

The CCD image sensor has less noise and better image quality than the CMOS image sensor, but the CMOS image sensor has an easier driving method and may be implemented in various scanning methods. In addition, because the CMOS image sensor may integrate a signal processing circuit on a single chip, miniaturization of a product is easier, and since the CMOS image sensor may be used interchangeably with CMOS process technology, manufacturing cost is lower. Because the CMOS image sensor has low power consumption, application to a mobile device is easier.

Although the CMOS image sensor is shown as an embodiment in FIG. 2, various image sensors capable of outputting the light source LS as the image layer IMG_LA which is digital data may be used. For example, the image sensor 200 may include a first converter 210 and a second converter 220.

The first converter 210 may be configured to convert the light source LS into an analog image signal IMG_an. For example, the first converter 210 may include a plurality of pixels disposed in a two-dimensional matrix form, and each pixel may output the analog image signal IMG_an corresponding to the light source LS. That is, each of the pixels may integrate a photo charge corresponding to an amount of the light source LS received through a photo diode and output the analog image signal IMG_an according to a current formed according to the integrated photo charge.

The second converter 220 may be configured to convert the analog image signal IMG_an into the image layer IMG_LA which is a digital signal.

Figure 3:
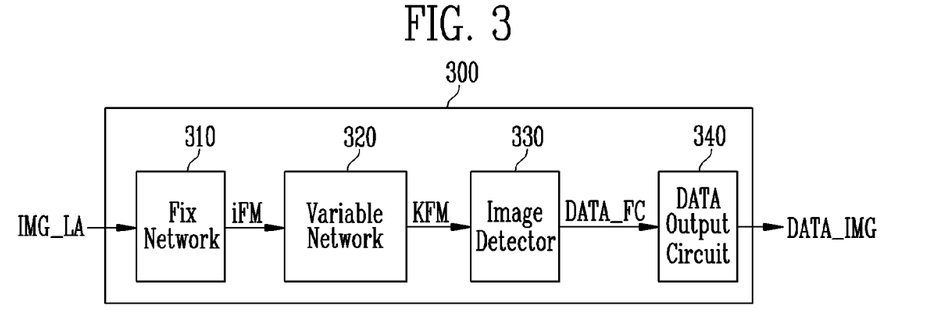
FIG. 3 is a diagram illustrating an image processor according to an embodiment of the present disclosure.

FIG. 3 is a diagram illustrating an image processor according to an embodiment of the present disclosure.

Referring to FIG. 3, the image processor 300 may be configured to convert the image layer IMG_LA into the image data DATA_IMG and output the image data DATA_IMG. The image processor 300 according to an embodiment includes a fix network 310, a variable network 320, an image detector 330, and a data output circuit 340.

The fix network 310 may be configured to receive the image layer IMG_LA corresponding to the first input layer for the subject, process the image layer IMG_LA using a kernel having a fixed size, also referred to as a fixed-size kernel, and generate an initial feature map iFM. For example, the fix network 310 may generate the initial feature map iFM having a depth of an image by performing a plurality of convolution operations and pooling using a filter having a fixed kernel size.

The convolution operation may be an operation of operating the input image layer IMG_LA and the kernel in a matrix method. The pooling may be an operation of generating a feature map by extracting a specific value from a convolutional layer generated by the convolution operation. For example, the pooling may be performed by extracting a maximum value from the convolutional layer or by extracting an average value from the convolutional layer, and may be performed by various other methods.

In some comparative cases, because feature maps including a feature map finally generated from an initial feature map are used in generating feature data in an image detector, complex convolution operations are performed multiple times in the image detector. Therefore, even though the size of the subject is large, because effectively decreasing a size of the feature map is difficult due to fixed pooling, many convolution operations are performed to extract the feature map. In the present embodiment, because the initial feature map iFM may be used as data for the convolution operation of the variable network 320 and the variable network 320 variably adjusts convolution and pooling sizes for extracting the feature map, fewer convolution operations may be performed than in the comparative cases. In addition, because the size of the receptive field suitable for the subject may be used, precision of the feature data DATA_FC may be increased.

The convolution operation refers to a learning algorithm or an operation method through a convolutional neural network (CNN), which is a type of deep learning technique.

The variable network 320 may be configured to generate a K-th feature map KFM by performing a convolution operation. For example, the variable network 320 may receive the initial feature map iFM as an input layer, adjust the receptive field according to the size of the subject based on the input initial feature map iFM, and perform a convolution operation and pooling. Therefore, a plurality of feature maps generated in the variable network 320 may be generated based on a feature map generated in a previous step. For example, the size of the receptive field to be used in a next convolution operation may be adjusted based on the feature map generated in the previous step, and the convolution operation using the receptive field for which the size is adjusted may be performed to generate a next feature map. A feature map finally generated among the feature maps generated in the variable network 320 may be output as the K-th feature map KFM. In the variable network 320, because the size of the receptive field is adjusted according to the size of the subject, an unnecessary convolution operation may be omitted.

The image detector 330 may be configured to generate channels by classifying the K-th feature map KFM finally generated in the variable network 320 for each color and generate the feature data DATA_FC including the generated channels. In the present embodiment, feature maps generated before the finally generated K-th feature map are not used in the image detector 330. Therefore, a convolution operation required for the image detector may be reduced.

The data output circuit 340 may convert a detected result into data and output the data. For example, the data output circuit 340 may be configured to output the feature data DATA_FC as it is or output the image data DATA_IMG by processing, compressing, or encrypting the feature data DATA_FC.

Figure 4:
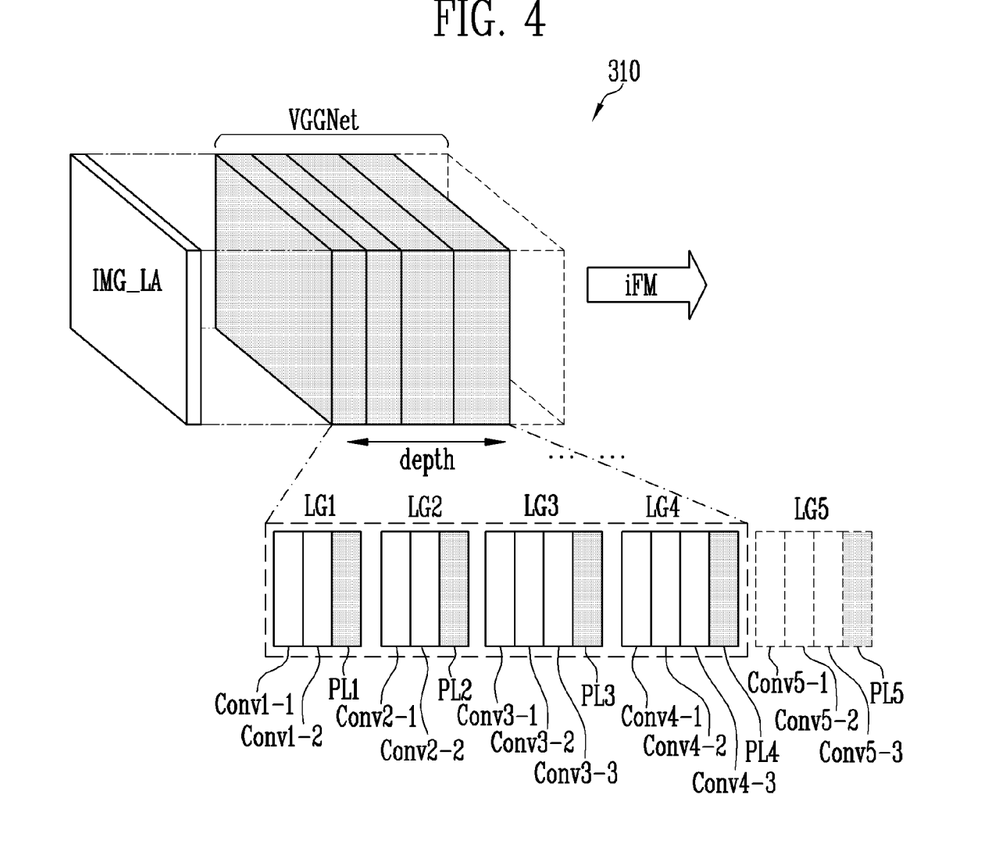
FIG. 4 is a diagram illustrating a fix network according to an embodiment of the present disclosure.

FIG. 4 is a diagram illustrating a fix network according to an embodiment of the present disclosure.

Referring to FIG. 4, the fix network 310 may be configured to generate the initial feature map iFM by performing the convolution operation and the pooling having a fixed kernel size. For example, the fix network 310 may be driven according to an operation method of a very deep convolutional networks (VGGNet). The VGGNet may be configured of at least one convolution layer and pooling layer. The convolution layer may be a result of the convolution operation of the image layer IMG_LA corresponding to an initial input layer for the subject and the kernel, and the pooling layer may be a result of extracting a specific value from the convolution layer. Therefore, the pooling layer of the fix network 310 may be a feature map for the image layer IMG_LA. For example, a plurality of convolutional layers may be generated with respect to the image layer IMG_LA, and one pooling layer for the plurality of convolutional layers may be generated. As the number of convolutional layers and pooling layers increases, the depth of the image may increase.

Assuming that first to fifth layer groups LG1 to LG5 may be generated in the VGGNet as shown in FIG. 4, in the present embodiment, the VGGNet may be set to generate some groups among the first to fifth layer groups LG1 to LG5. For example, in the present embodiment, the VGGNet may be set so as to generate only the first to fourth layer groups LG1 to LG4 and so as not to generate the fifth layer group LG5. Because the depth of the image is proportional to the number of layer groups, a more precise feature map may be generated as the number of layer groups increases. However, in the present embodiment, because the feature map generated in the fix network 310 is not directly used in the image detector 330 of FIG. 3 and is used only in the variable network 320 of FIG. 3, the initial feature map iFM may be generated through some layer groups rather than all layer groups. In the present embodiment, the first to fourth layer groups LG1 to LG4 are generated, but the VGGNet may be set to generate all layer groups that may be generated by the VGGNet, and the VGGNet may be set to generate fewer layer groups than the first to fourth layer groups LG1 to LG4. As described above, when only some layer groups are generated in the VGGNet, a time required for an operation in the VGGNet may be shortened and complexity of the operation may also be reduced.

The first layer group LG1 may include (1-1)-th and (1-2)-th convolutional layers Conv1-1 and Conv1-2 generated by a convolution operation on the image layer IMG_LA, and a first pooling layer PL1 generated by processing the (1-1)-th and (1-2)-th convolutional layers Conv1-1 and Conv1-2. The second layer group LG2 may include (2-1)-th and (2-2)-th convolutional layers Conv2-1 and Conv2-2 generated by a convolution operation on the first pooling layer PL1, and a second pooling layer PL2 generated by processing the (2-1)-th and (2-2)-th convolutional layers Conv2-1 and Conv2-2. The third layer group LG3 may include (3-1)-th to (3-3)-th convolutional layers Conv3-1 to Conv3-3 generated by a convolution operation on the second pooling layer PL2, and a third pooling layer PL3 generated by processing the (3-1)-th to (3-3)-th convolutional layers Conv3-1 to Conv3-3. The fourth layer group LG4 may include (4-1)-th to (4-3)-th convolutional layers Conv4-1 to Conv4-3 generated by a convolution operation on the third pooling layer PL3, and a fourth pooling layer PL4 generated by processing the (4-1)-th to (4-3)-th convolutional layers Conv4-1 to Conv4-3. The fifth layer group LG5 also may include (5-1)-th to (5-3)-th convolutional layers Conv5-1 to Conv5-3 generated by a convolution operation on the fourth pooling layer PL4, and a fifth pooling layer PL5 generated by processing the (5-1)-th to (5-3)-th convolutional layers Conv5-1 to Conv5-3. As described above, in the present embodiment, an operation of selecting the layers included in the first to fourth layer groups LG1 to LG4 and generating the fifth layer group LG5 may be omitted. However, all layers Conv1-1 to PL3 included in the first to third layer groups LG1 to LG3 and some layers Conv4-1 to Conv4-3 included in the fourth layer group LG4 may be selected. The pooling layer last generated in the VGGNet by performing the processing operation on the selected layers may be output as the initial feature map iFM.

Figure 5:
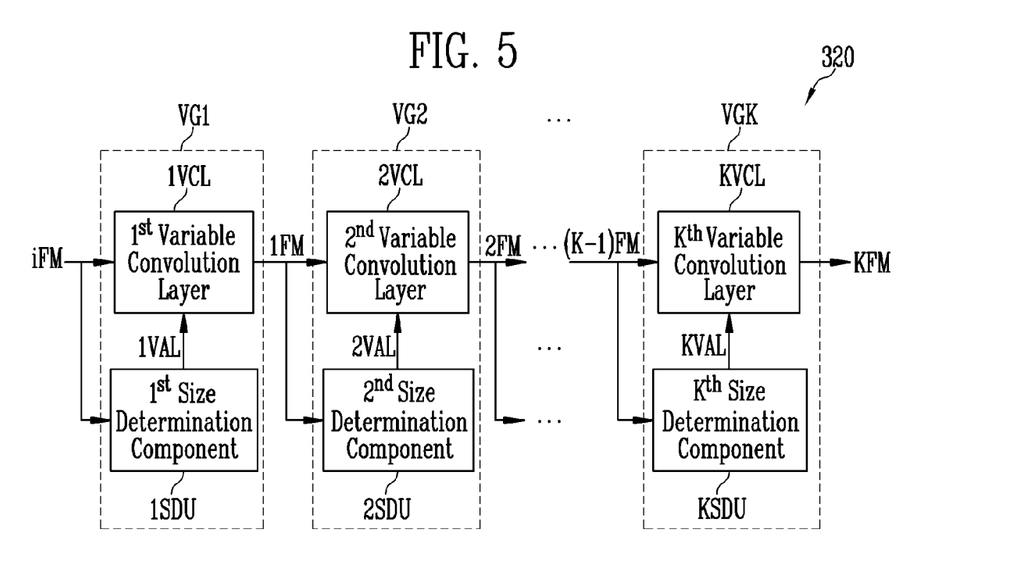
FIG. 5 is a diagram illustrating a variable network according to an embodiment of the present disclosure.

FIG. 5 is a diagram illustrating a variable network according to an embodiment of the present disclosure.

Referring to FIG. 5, the variable network 320 may be configured to generate the K-th feature map KFM using a deep learning technique using the initial feature map iFM generated in the fix network 310 of FIG. 4. In the variable network 320, the size of the kernel, also referred to as a variable-size kernel, may be adjusted according to the size of the image, and the size of the receptive field may also be adjusted by the adjustment of the size of the kernel. For example, the variable network 320 may include first to K-th variable layer groups VG1 to VGK.

Each of the first to K-th variable layer groups VG1 to VGK may determine the kernel size based on the feature map generated in a previous layer group, and perform a convolution operation using the determined kernel size to generate the feature map. For example, when all images of the subject included in a previous receptive field are included in the previous receptive field, the size of the kernel to be used in a next operation may be maintained the same as before, and thus the size of a next receptive field may also be maintained the same as before. When the image of the subject included in the receptive field is greater than the previous receptive field, the size of the kernel to be used in the next operation may be increased, and thus the size of the next receptive field may also be increased.

That is, because the size of the kernel and the receptive field is adjusted according to the image size of the subject, the finally generated feature map may be generated by the kernel and the receptive field optimized for the image of the subject. Accordingly, in the present embodiment, the K-th feature map KFM, which is the feature map finally generated in the variable network 320, is used as input data of the image detector 330 of FIG. 3, and feature maps generated before the K-th feature map KFM are not used as the input data of the image detector 330.

The first to K-th variable layer groups VG1 to VGK are specifically described as follows.

The first variable layer group VG1 may generate a first feature map 1FM by processing the initial feature map iFM, the second variable layer group VG2 may generate a second feature map 2FM by processing the first feature map 1FM, and so forth until finally the K-th variable layer group VGK may generate the K-th feature map KFM by processing a (K−1)-th feature map (K−1)FM. When the K-th variable layer group VGK is the last group among the variable layer groups included in the variable network 320, the K-th feature map KFM generated in the K-th variable layer group VGK is the final feature map.

The first variable layer group VG1 may include a first size determination component 1SDU and a first variable convolution layer 1VCL. The first size determination component 1SDU may be configured to compare the image size of the subject, which is an image processing target, with the size of the preset receptive field using data included in the initial feature map iFM, and output a first compensation value 1VAL as a result of the comparison. For example, the first size determination component 1SDU may output the first compensation value 1VAL having different values in a case where the image size of the subject is less than or equal to the size of the preset receptive field and a case where the image size of the subject is greater than the size of the preset receptive field. The first variable convolution layer 1VCL may adjust the size of the kernel according to the first compensation value 1VAL, operate the initial feature map iFM using the adjusted kernel as a filter, and generate the first feature map 1FM as a result of the operation. For example, the first variable convolution layer 1VCL may set a first receptive field having a first size according to the size of the adjusted kernel and perform a convolution operation on the initial feature map iFM according to the first receptive field to generate the first feature map 1FM.

The second variable layer group VG2 may include a second size determination component 2SDU and a second variable convolution layer 2VCL. The second size determination component 2SDU may be configured to compare the image size of the subject, which is an image processing target, with the size of the first receptive field used in the first variable convolutional layer 1VCL, by using data included in the first feature map 1FM, and output a second compensation value 2VAL as a result of the comparison. For example, the second size determination component 2SDU may output the second compensation value 2VAL having different values in a case where the image size of the subject is less than or equal to the size of the first receptive field and a case where the image size of the subject is greater than the size of the first receptive field. The second variable convolution layer 2VCL may adjust the size of the kernel according to the second compensation value 2VAL, operate the first feature map 1FM using the adjusted kernel as a filter, and generate the second feature map 2FM as a result of the operation.

Finally, the K-th variable layer group VGK may include a K-th size determination component KSDU and a K-th variable convolution layer KVCL. The K-th size determination component KSDU may be configured to compare the image size of the subject, which is an image processing target, with the size of the (K−1)-th receptive field used in the (K−1)th variable convolutional layer, by using data included in the (K−1)-th feature map (K−1)FM, and output a K-th compensation value KVAL as a result of the comparison. For example, the K-th size determination component KSDU may output the K-th compensation value KVAL having different values in a case where the image size of the subject is less than or equal to the size of the (K−1)-th receptive field and a case where the image size of the subject is greater than the size of the (K−1)-th receptive field. The K-th variable convolution layer KVCL may adjust the size of the kernel according to the K-th compensation value KVAL, operate the (K−1)-th feature map (K−1)FM using the adjusted kernel as a filter, and generate the K-th feature map KFM as a result of the operation.

As described above, the first to K-th variable layer groups VG1 to VGK may compare the image size of the previous feature map with the size of the previous receptive field, and determine the size of the next kernel and the next receptive field according to the comparison result. Therefore, the K-th feature map KFM generated by using the size of the kernel and the receptive field optimized for the image size of the subject may be generated.

Figure 6A:
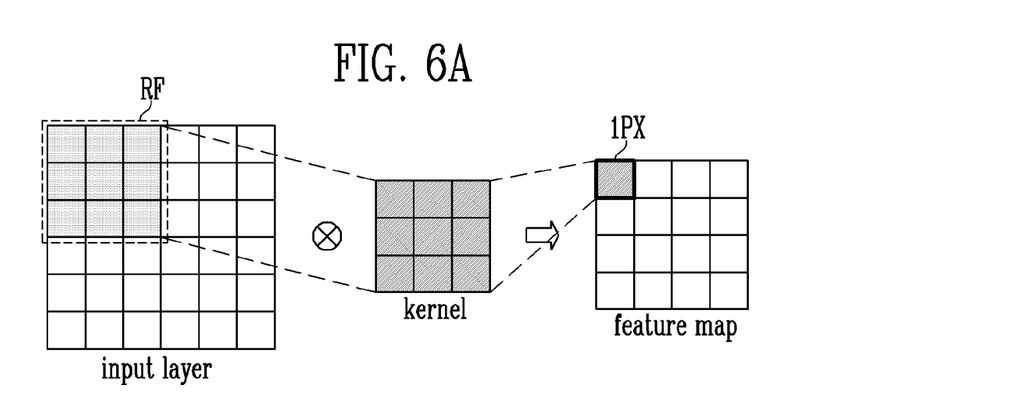
FIGS. 6A, 6B, and 6C are diagrams illustrating a method of generating a feature map.
Figure 6B:
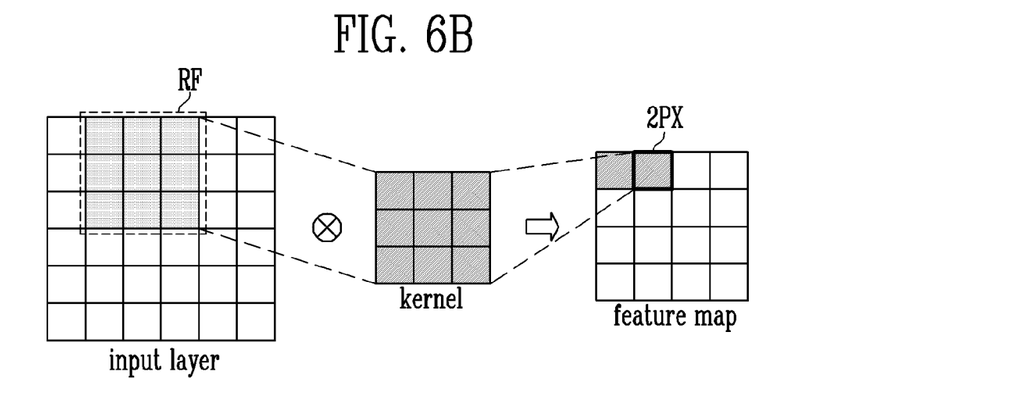
Figure 6C:
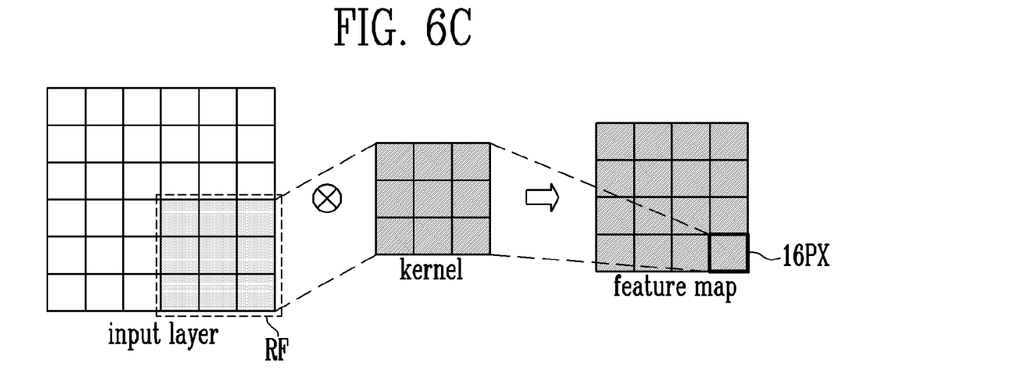

FIGS. 6A, 6B, and 6C are diagrams specifically illustrating a method of generating the feature map.

Referring to FIG. 6A, when an inputted feature map is configured in 6×6 size and a kernel is configured in 3×3 size, a size of a receptive field RF may be set to a 3×3 size equal to the size of the kernel. In the following description, the inputted feature map is described as an 'input feature map', and a feature map generated as a result of an operation of the input feather map is described as an 'output feature map'. The size of the kernel is a unit of pixel in which an operation value is stored. The input feature map may be a layer input for the convolution operation in the variable network 320 of FIG. 5. Each pixel of the input feature map may include a weight value for the image of the subject. Among the pixels of the input feature map, a convolution operation of a value corresponding to pixels included in the receptive field RF and information of the kernel may be performed, and an operation result value may be stored in a first pixel 1PX of the output feature map.

Referring to FIG. 6B, as shown in FIG. 6A, when the operation result value is stored in the first pixel 1PX of the output feature map, a position of the receptive field RF may be moved in one pixel unit to process a next value. For example, when the operation result value is stored in the first pixel 1PX, the position of the receptive field RF may be moved to the right by one pixel in the input feature map for the next convolution operation. Because the position of the receptive field RF is changed in the input feature map, information included in the changed receptive field RF is also changed. Therefore, a convolution operation on the information included in the receptive field RF and information of the kernel may be performed, and an operation result value may be stored in a second pixel 2PX of the output feature map.

Referring to FIG. 6C, a convolution operation of the kernel and the input layer may be performed while the position of the receptive field RF is moved in the method described with reference to FIGS. 6A and 6B. When an operation result value is stored in a sixteenth pixel 16PX, which is the last pixel in the output feature map, the output feature map for the input feature map may be completed.

Figure 7A:
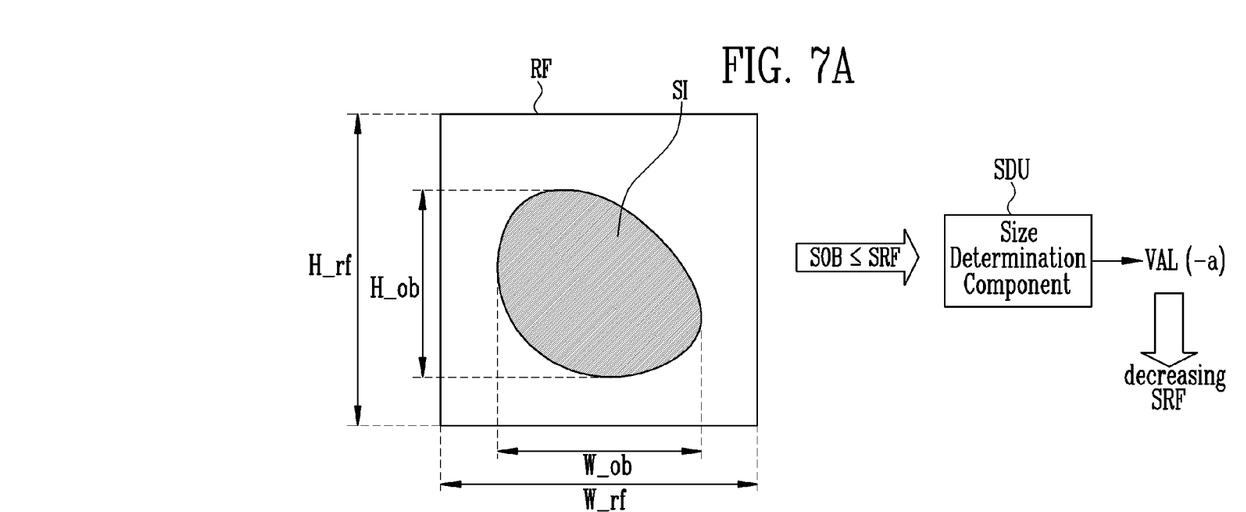
FIGS. 7A and 7B are diagrams illustrating a method of setting a variable value by a size determination component according to an embodiment of the present disclosure.
Figure 7B:
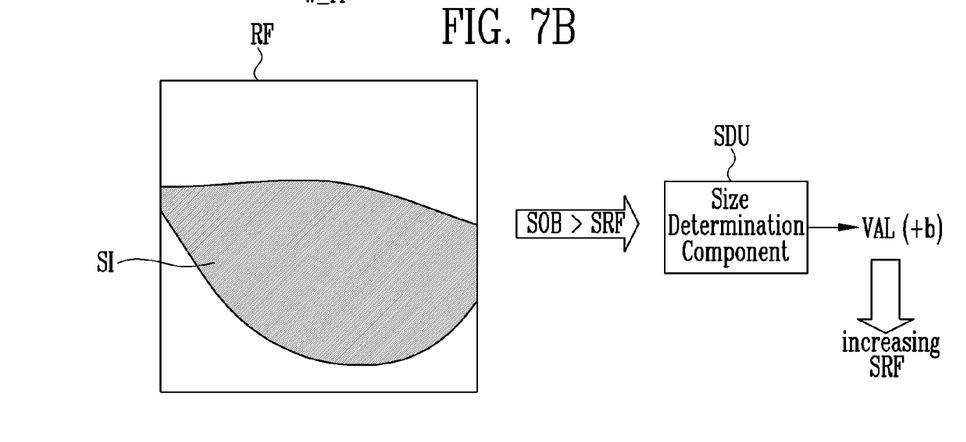

FIGS. 7A and 7B are diagrams illustrating a method of setting a variable value by a size determination component according to an embodiment of the present disclosure.

Referring to FIGS. 7A and 7B, the size determination component SDU may be any one of the first to K-th size determination components 1SDU to KSDU shown in FIG. 5. The size determination component SDU may compare a size of a subject image SI included in the input layer with the size of the receptive field RF, and output a compensation value VAL as a result of the comparison. In the following description, the size of the subject image SI is referred to as a subject size SOB, and the size of the receptive field RF is referred to as a receptive field size SRF.

The subject size SOB may be set as a horizontal length W_ob of the subject image SI, may be set as a vertical length H_ob of the subject image SI, may be set as the horizontal length W_ob and the vertical length H_ob of the subject image SI, or may be set as an area of the subject image SI. Among them, when the subject image SI is set based on the area, because the size determination component SDU is required to additionally perform an operation for calculating the area of the subject image SI, it is preferably that the subject image SI is set based on horizontal length W_ob or the vertical length H_ob.

The subject size SOB may be determined through the values stored in the pixels of the input layer. The receptive field size SRF may be set as a horizontal length W_rf of the receptive field RF, may be set as a vertical length H_rf of the receptive field RF, may be set as the horizontal length W_rf and the vertical length H_rf of the receptive field RF, or may be set as an area of the receptive field RF. The size determination component SDU may be configured to compare the same targets of the subject size SOB and the receptive field size SRF with each other. For example, when a comparison target of the size is set as a horizontal length, the size determination component SDU may compare the horizontal length W_ob of the subject image SI with the horizontal length W_rf of the receptive field RF, and output a compensation value VAL as a comparison result.

In order to output the compensation value VAL from the size determination component SDU, the size determination component is trained in a reinforcement learning method, and the learning method is as follows. Initially, the kernel size may be randomly selected for each position of the size determination component SDU, and the size determination component SDU may operate the receptive field size SRF using the selected kernel size. For example, the size determination component SDU may compare the operated receptive field size with the subject size SOB, and when the receptive field size is greater than the subject size or similar to the subject size (SRF≥SOB), the compensation (compensation) value VAL-a may be applied. When the receptive field size operated from the selected kernel size is less than the subject size (SRF<SOB), the size determination component SDU may determine the selected kernel size as an appropriate size and apply the compensation value VAL (+b). Because the learning is performed in a direction of increasing the compensation value VAL, the size determination component SDU is trained to determine the kernel size so that the subject size and the receptive field size are similar to each other.

When the learning of the kernel size is completed, the size determination component SDU may adjust the compensation value VAL according to the input feature map. For example, the size determination component SDU may increase the compensation value VAL to increase the receptive field size SRF when the object size SOB is large, and might not increase the compensation value VAL when the subject size SOB is not large.

Figure 8A:
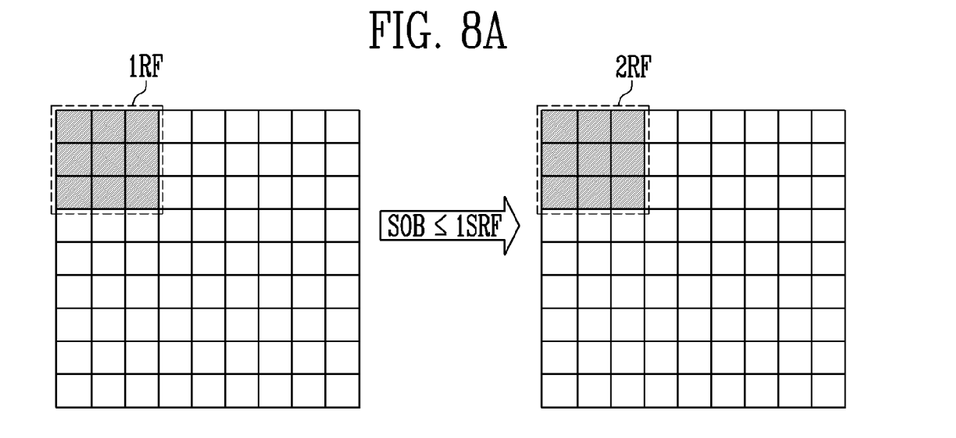
FIGS. 8A and 8B are diagrams illustrating a method of changing a receptive field when the receptive field has a minimum value.
Figure 8B:
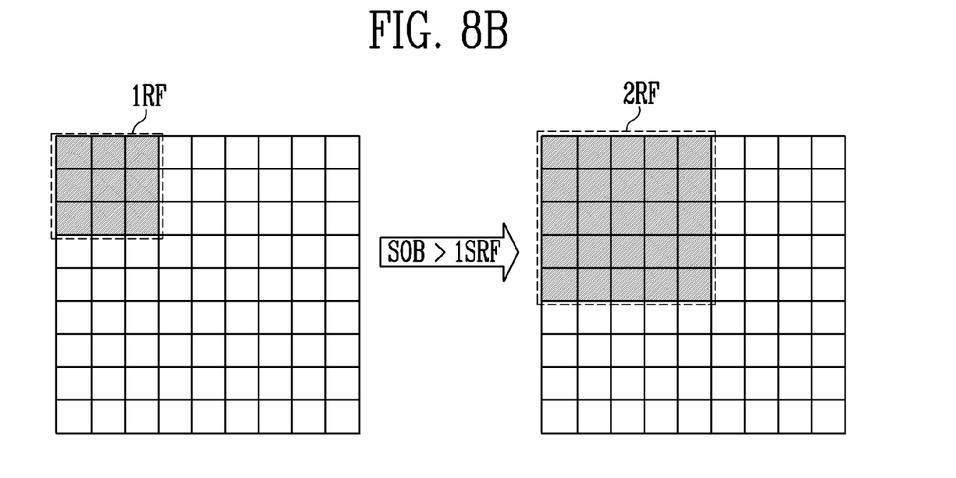

FIGS. 8A and 8B are diagrams illustrating a method of changing the receptive field when the receptive field is at a minimum value.

Referring to FIG. 8A, it is assumed that the receptive field for comparing the subject size is defined as a first receptive field 1RF, and the receptive field for which the size is adjusted according to the comparison result of the size determination component SDU of FIG. 7A or 7B is a second receptive field 2RF. When the size of the first receptive field 1RF has a minimum value at which the size of the first receptive field 1RF may no longer be decreased, the subject size SOB may be compared with a first receptive field size 1SRF, which is the entire size of the first receptive field 1RF. For example, when the subject size SOB is equal to or less than the first receptive field size 1SRF of the first receptive field 1RF (SOB≤1SRF), the size of the kernel may be maintained to be the same as that of the first receptive field 1RF, and thus a size of the second receptive field 2RF may be maintained to be the same as the size of the first receptive field 1RF. That is, when the size of the first receptive field 1RF is at the minimum value, even though the subject size SOB is less than the first receptive field size 1SRF, because the size of the first receptive field 1RF may no longer be decreased, the kernel and the second receptive field 2RF having the same size as the size of the first receptive field 1RF may be set.

Referring to FIG. 8B, when the subject size SOB is greater than the first receptive field size 1SRF of the first receptive field 1RF (SOB>1SRF), the size of the kernel may be set to be greater than the size of the first receptive field 1RF, and thus the size of the second receptive field 2RF may be set to be greater than the size of the first receptive field 1RF. That is, when the size of the first receptive field 1RF is at the minimum value, because the size of the receptive field may be adjusted to be increased, the kernel and the second receptive field 2RF having the size greater than the size of the first receptive field 1RF may be set.

When the size of the second receptive field 2RF and the kernel is determined as in the embodiment described with reference to FIG. 8A or 8B, a convolution operation of information of an input layer included in the determined second receptive field 2RF and kernel may be performed, and thus the feature map may be generated.

Figure 9A:
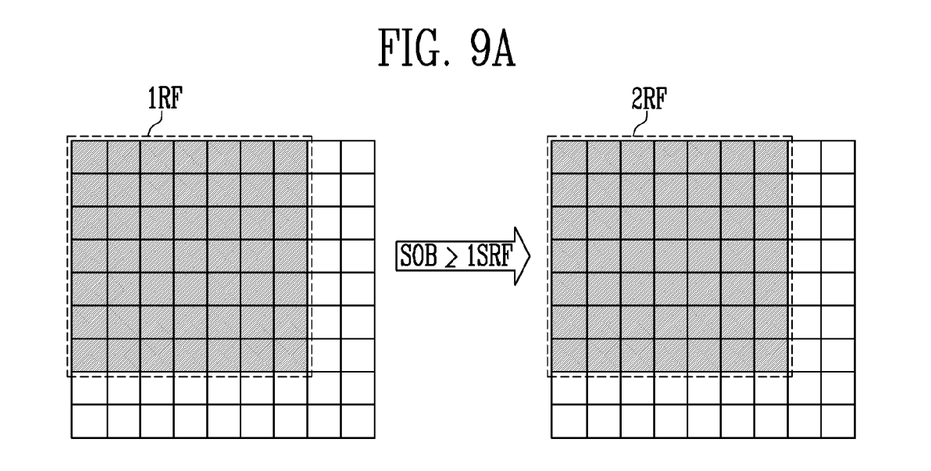
FIGS. 9A and 9B are diagrams illustrating a method of changing the receptive field when the receptive field has a maximum value.
Figure 9B:
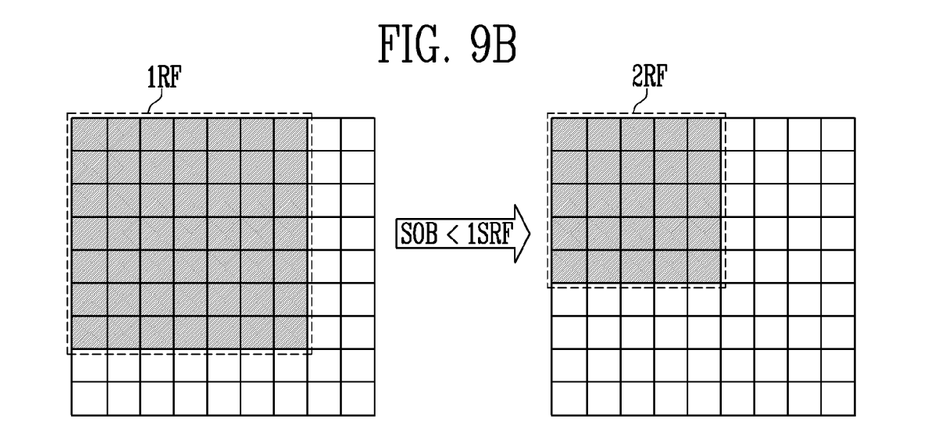

FIGS. 9A and 9B are diagrams illustrating a method of changing the receptive field when the receptive field is at a maximum value.

Referring to FIG. 9A, it is assumed that the receptive field for comparing the subject size is defined as the first receptive field 1RF, and the receptive field for which the size is adjusted according to the comparison result of the size determination component SDU of FIG. 7A or 7B is the second receptive field 2RF. When the size of the first receptive field 1RF has a maximum value at which the size of the first receptive field 1RF may no longer be increased, the subject size SOB may be compared with the first receptive field size 1SRF, which is the entire size of the first receptive field 1RF. For example, when the subject size SOB is equal to or greater than the first receptive field size 1SRF of the first receptive field 1RF (SOB≥1SRF), the size of the kernel may be maintained to be the same as that of the first receptive field 1RF, and thus the size of the second receptive field 2RF may be maintained to be the same as the size of the first receptive field 1RF. That is, when the size of the first receptive field 1RF is at the maximum value, even though the subject size SOB is equal to or greater than the first receptive field size 1SRF, because the size of the first receptive field 1RF cannot be increased, the second receptive field 2RF having the same size as the size of the first receptive field 1RF may be set.

Referring to FIG. 9B, when the subject size SOB is less than the first receptive field size 1SRF of the first receptive field 1RF (SOB<1SRF), the size of the kernel may be set to be less than the size of the first receptive field 1RF, and thus the size of the second receptive field 2RF may be set to be less than the size of the first receptive field 1RF. That is, when the size of the first receptive field 1RF is at the maximum value, because the size of the receptive field may be adjusted to be decreased, the second receptive field 2RF having the size less than the size of the first receptive field 1RF may be set.

When the size of the second receptive field 2RF and the kernel is determined as in the embodiment described with reference to FIG. 9A or 9B, a convolution operation of information of an input layer included in the determined second receptive field 2RF and kernel may be performed, and thus the feature map may be generated.

Figure 10A:
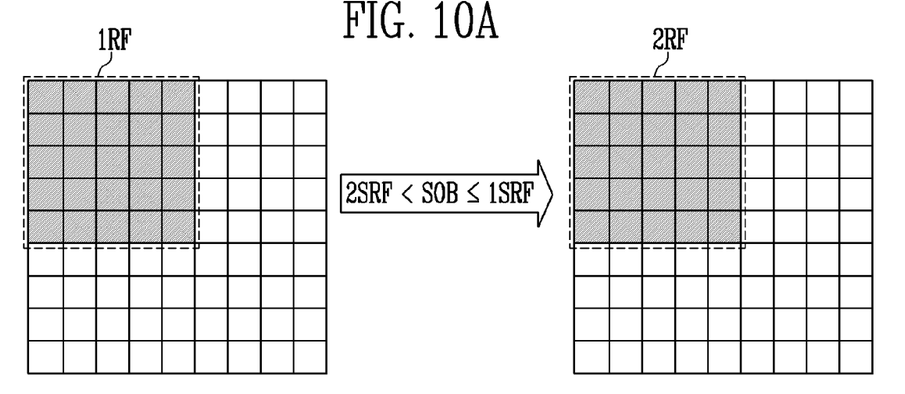
FIGS. 10A, 10B, and 10C are diagrams illustrating a method of changing the receptive field when the receptive field has an intermediate value.
Figure 10B:
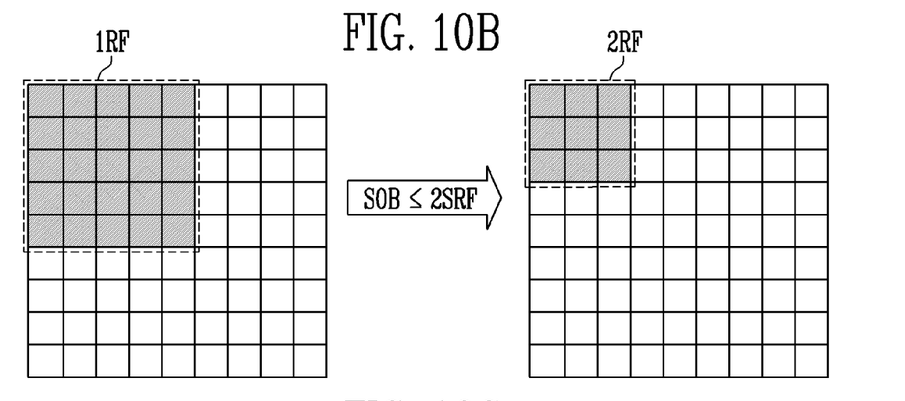
Figure 10C:
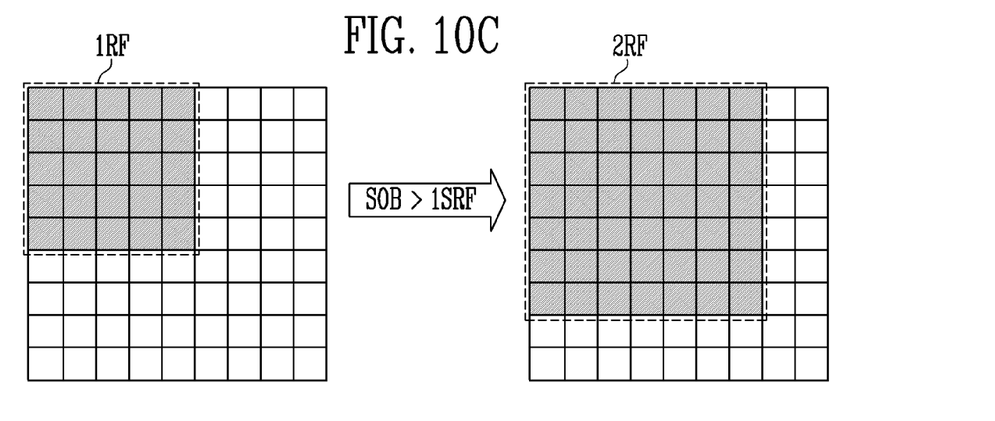

FIGS. 10A, 10B, and 10C are diagrams illustrating a method of changing the receptive field when the receptive field is at an intermediate value.

Referring to FIG. 10A, it is assumed that the receptive field for comparing the subject size is defined as the first receptive field 1RF, and the receptive field for which the size is adjusted according to the comparison result of the size determination component SDU of FIG. 7A or 7B is the second receptive field 2RF. When the size of the first receptive field 1RF has an intermediate value that may be decreased or increased, the subject size SOB may be compared with each of a first receptive field size 1SRF corresponding to the entire size of the first receptive field 1RF and a second receptive field size 2SRF less than the entire size. For example, when the first receptive field size 1SRF is set to 100% of the size of the first receptive field 1RF, the second receptive field size 2SRF may be set to 80% of the size of the first receptive field 1RF. A ratio of the size may be set to various values.

When the subject size SOB is equal to or less than the first receptive field size 1SRF and greater than the second receptive field size 2SRF (2SRF<SOB≤1SRF), the size of the kernel may be maintained at the same size as the first receptive field 1RF, and thus the size of the second receptive field 2RF may be maintained to be the same as the size of the first receptive field 1RF. That is, even though the subject size SOB is less than the first receptive field size 1SRF, when a difference of the size is not too large, because the size of the first receptive field 1RF does not need to be decreased, the second receptive field 2RF having the same size as the size of the first receptive filed 1RF may be set.

Referring to FIG. 10B, when the subject size SOB is equal to or less than the second receptive field size 2SRF (SOB≤2SRF), the size of the kernel may be set to be less than the first receptive field 1RF, and thus the size of the second receptive field 2RF may be set to be less than the size of the first receptive field 1RF. That is, when the size of the first receptive field 1RF is at an intermediate value and the subject size SOB is too small compared to the first receptive field size 1SRF, the second receptive field 2RF having a size less than the size of the first receptive field 1RF may be set.

Referring to FIG. 10C, when the subject size SOB is greater than the first receptive field size 1SRF (SOB>1SRF), the size of the kernel may be set to be greater than the size of the first receptive field 1RF, and thus the size of the second receptive field 2RF may be set to be greater than the size of the first receptive field 1RF. That is, when the size of the first receptive field 1RF is at an intermediate value, because the size of the receptive field may be adjusted to be increased, the kernel and the second receptive field 2RF having the size greater than the size of the first receptive field 1RF may be set.

When the size of the second receptive field 2RF and the kernel is determined as in the embodiment described with reference to FIG. 10A, 10B, or 10C, a convolution operation of information of an input layer included in the determined second receptive field 2RF and kernel may be performed, and thus the feature map may be generated.

Figure 11:
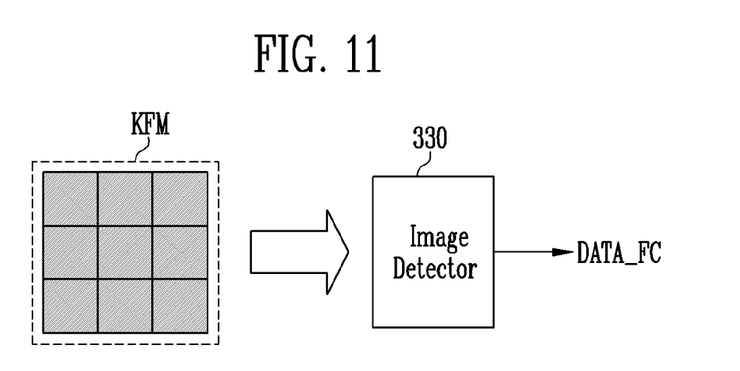
FIG. 11 is a diagram illustrating a method of operating an image detector according to an embodiment of the present disclosure.

FIG. 11 is a diagram illustrating a method of operating an image detector according to an embodiment of the present disclosure.

Referring to FIG. 11, the image detector 330 may be configured to classify the finally generated K-th feature map KFM for each color to generate the channels and generate the feature data DATA_FC including the generated channels. That is, in an embodiment, because the variable network 320 of FIG. 5 adjusts the size of the kernel and the receptive field according to the image size of the subject, the occurrence of the size of the receptive field being excessively increased when the image size of the subject is small may be prevented, and that the occurrence of the size of the receptive filed being excessively decreased when the subject size is large may be prevented. Accordingly, an operation time and complexity of the operation used to convert the image of the subject into the feature data DATA_FC may be improved.

What is claimed is:

1. An electronic device comprising:
an image sensor configured to sense light sourced from a subject and generate an image layer; and
an image processor configured to:
generate a feature map by performing a convolution operation on the image layer and a fixed-size kernel;
generate a final feature map by performing convolution operations on a variable-size kernel and the feature map; and
generate image data including channels in which the final feature map is classified for each color,
wherein the image processor comprises:
a fix network configured to generate the feature map by performing the convolution operation on the fixed-size kernel and the image layer;
a variable network configured to generate a plurality of feature maps by performing the convolution operations using the variable-size kernel, wherein the plurality of feature maps include the final feature map and are different from the feature map;
an image detector configured to detect the channels classified for each color from the final feature map among the plurality of feature maps and generate feature data including the channels; and a data output circuit configured to output the feature data as it is, or output the image data by processing, compressing, or encrypting the feature data.

2. The electronic device of claim 1, wherein the image sensor comprises:

a first converter configured to receive the light sourced from the subject and output an analog image signal; and a second converter configured to convert the analog image signal into the image layer, which is a digital signal.

3. The electronic device of claim 1, wherein the fix network is configured to generate the feature map by using a very deep convolutional networks (VGGnet) technique among convolutional neural network techniques.

4. The electronic device of claim 1, wherein the fix network is configured to:

perform a convolution operation and pooling using the fixed-size kernel as a filter; and generate the feature map as a result of the pooling.

5. The electronic device of claim 1, wherein the variable network includes a plurality of variable layer groups configured to generate the plurality of feature maps by using the variable-size kernel as a filter.

6. The electronic device of claim 5, wherein each of the plurality of variable layer groups comprises:

a size determination component configured to compare an image size of an input feature map with a size of a preset receptive field and output a compensation value; and a variable convolution layer configured to adjust a size of the variable-size kernel and a size of the receptive field according to the compensation value, and generate a next feature map using the adjusted variable-size kernel and receptive field.

7. The electronic device of claim 6, wherein a first variable layer group among the plurality of variable layer groups is configured to receive the feature map and generate an output feature map, and each of remaining variable layer groups except for the first variable layer group is configured to receive a feature map generated in a previous variable layer group and generate an output feature map to be input to a next variable layer group.

8. The electronic device of claim 6, wherein the size determination component is configured to:

output the compensation value for decreasing the size of the variable-size kernel when the image size of the input feature map is less than the size of the preset receptive field; and output the compensation value for increasing the size of the variable-size kernel when the image size of the input feature map is greater than the size of the preset receptive field.

9. The electronic device of claim 6, wherein when the size of the preset receptive field is at a minimum value, the size determination component is configured to:

output the compensation value for maintaining the size of the variable-size kernel when the image size of the input feature map is equal to or less than the size of the preset receptive field; and output the compensation value for increasing the size of the variable-size kernel when the image size of the input feature map is greater than the size of the preset receptive field.

10. The electronic device of claim 6, wherein when the size of the preset receptive field is at a maximum value, the size determination component is configured to:

output the compensation value for maintaining the size of the variable-size kernel when the image size of the input feature map is equal to or less than the size of the preset receptive field; and output the compensation value for increasing the size of the variable-size kernel when the image size of the input feature map is greater than the size of the preset receptive field.

11. The electronic device of claim 6, wherein when the size of the preset receptive field is at an intermediate value between a minimum value and a maximum value, the size determination component is configured to:

output the compensation value for maintaining the size of the variable-size kernel when the image size of the input feature map is included between a first size of the preset receptive field and a second size less than the first size;

output the compensation value for decreasing the size of the variable-size kernel when the image size of the input feature map is equal to or less than the second size; and output the compensation value for increasing the size of the variable-size kernel when the image size of the input feature map is greater than the first size.

12. A method of operating an electronic device, the method comprising:

converting an image of a subject into an image layer;

generating the image layer as an initial feature map by performing a convolution operation using a fixed-size kernel on the image layer;

comparing a size of the subject included in the initial feature map with a size of a receptive field;

generating a plurality of feature maps, wherein the plurality of feature maps are different from the initial feature map, by adjusting the size of a variable-size kernel and the receptive field according to the comparing; and generating channels in which a final feature map among the plurality of feature maps is classified for each color, and generating feature data including the channels.

13. The method of claim 12, wherein converting the image of the subject into the image layer comprises:

converting the image of the subject into an analog image signal; and converting the analog image signal into an image layer, which is a digital signal.

14. The method of claim 12, wherein generating the image layer as the initial feature map and generating the plurality of feature maps are performed by a convolutional neural network method.

15. The method of claim 12, wherein generating the image layer as the initial feature map comprises:

generating a convolutional layer by performing the convolution operation using the fixed-size kernel; and generating the image layer as the initial feature map by pooling the convolutional layer.

16. The method of claim 15, wherein in generating the convolutional layer, a receptive field having a fixed size is used.

17. The method of claim 12, wherein comparing the size of the subject included in the initial feature map with the size of the receptive field comprises:

comparing a horizontal length, a vertical length, or an area of the image included in the initial feature map with a horizontal length, a vertical length, or an area of the receptive field, respectively; and generating a compensation value for adjusting the size of the variable-size kernel according to the comparing.

18. The method of claim 17, wherein generating the plurality of feature maps comprises:

adjusting the size of the variable-size kernel according to the compensation value and adjusting the size of the receptive field according to the adjusted size of the variable-size kernel; and sequentially generating the plurality of feature maps by performing a convolution operation using the receptive field and the variable-size kernel.

19. The method of claim 18, wherein in generating the plurality of feature maps a feature map generated in a previous step is used as an input feature map of a next step, wherein the feature map generated in a previous step includes the initial feature map.

\* \* \* \* \*